Sept. 1, 1959  J. C. GRAVES ET AL  2,902,065
POWER SAW BLADE ANCHORING DEVICE
Filed Oct. 18, 1957

INVENTORS
JERRIMIAH C. GRAVES,
FLOYD W. GRAVES,
BY
McMorrow, Berman + Davidson
ATTORNEYS.

United States Patent Office 2,902,065
Patented Sept. 1, 1959

2,902,065

POWER SAW BLADE ANCHORING DEVICE

Jerrimiah C. Graves, Burney, and Floyd W. Graves, Hayfork, Calif.

Application October 18, 1957, Serial No. 691,067

4 Claims. (Cl. 143—32)

The present invention relates to an anchoring device for use with a power saw blade.

An object of the present invention is to provide an anchoring device for a power saw blade which lends itself to efficient steadying of the blade when cutting shrubbery, branches, or the like.

Another object of the present invention is to provide an anchoring device for a power saw blade which is readily attached to and detached from the blade.

A further object of the present invention is to provide an anchoring device for a power saw blade which lends itself to one-hand installation on a blade and one-hand removal from the blade.

These and other objects and advantages of the present invention will be fully apparent from the following description when taken in connection with the annexed drawing, in which.

Figure 1:
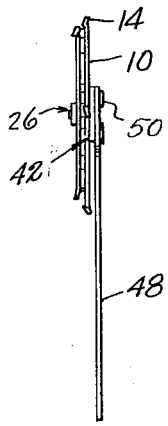
Figure 1 is an elevational end view.
Figure 2:
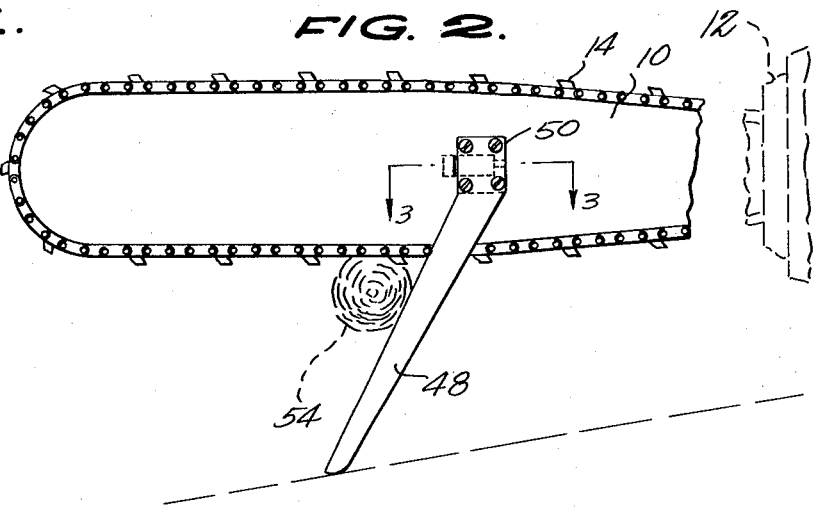
Figure 2 is an elevational view of the assembly shown in Figure 1 with a portion of the power saw blade broken away.

Referring in greater detail to the drawing in which like numerals indicate like parts throughout the several views, the anchoring device of the present invention is used in combination with an elongated blade 10 of a portable power saw, the latter being shown by dotted lines in Figure 2 and indicated by the reference numeral 12. An articulated chain saw 14 is mounted on the perimeter of the blade 10 for travel thereabout.

The blade 10 is provided with a rectangular opening 16 extending therethrough and having a pair of spaced side walls 18 and 20 and end walls 22 and 24 connecting the adjacent ends and extending between the adjacent ends of side walls 18 and 20.

The anchoring device of the present invention comprises a block, designated generally by the reference numeral 26, the block 26 being conformably shaped to fit within the opening 16 in the blade 10 and having a tongue 28 projecting from one end of the block 26 and extending from one face of the block to a point adjacent to and spaced from the other face of the block.

Figure 3:
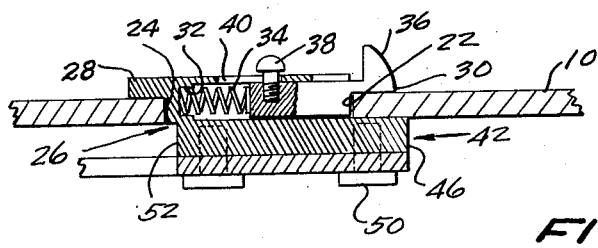
Figure 3 is a sectional view on an enlarged scale taken on the line 3—3 of Figure 2.
Figure 4:
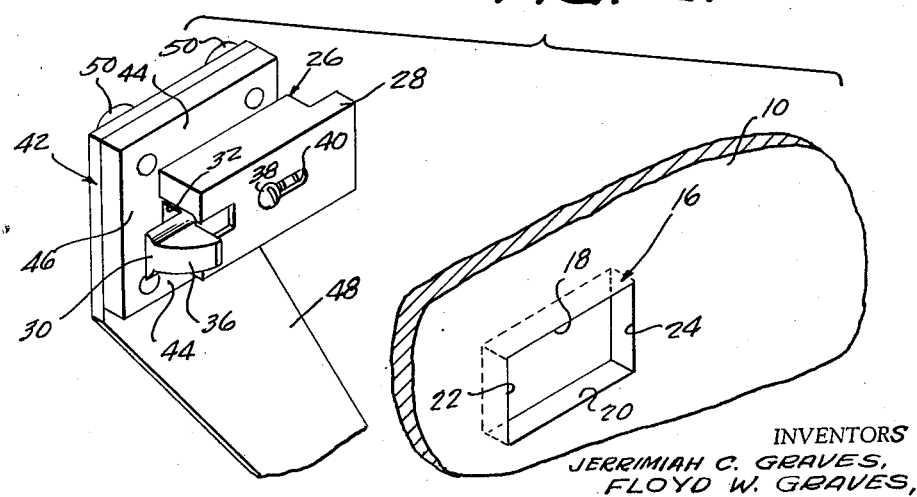
Figure 4 is an isometric exploded view with a portion of the blade broken away.

A latch element 30 is provided and has one end normally positioned exteriorly of the end of the block 26 remote from the tongue 28 and is mounted within a slideway provided in the block 26 for movement to a position in which the end normally exteriorly of the block 26 is fully within the block 26. The slideway is designated by the numeral 32 in Figures 3 and 4.

Spring means is provided operatively connected to the latch element 30 urging the latter to the position exteriorly of the end of the block 26. Specifically, this means consists in a coil spring 34 positioned within the slideway 32 between the end of the latch element 30 remote from the projecting end portion and the closed end of the slideway 32. The spring 34 has one end bearing against the closed end of the slideway 32 and has the other end bearing against the adjacent end of the latch element 30.

The latch element 30 is provided with a cam face 36 on the part of the latch element 30 which projects exteriorly of the block 26, and out of the slideway 32. The cam face 36 is engageable with the end wall 22 of the opening 16 when the block 26 is insertable into the opening 16. Engagement of the cam face 36 with the opening end wall 22 effects the sliding movement of the latch element 30 to the position in which the adjacent end portion is fully within the block 26.

A bolt 38 extends through a slot 40 provided in the block 26 and is threaded into the latch element 30 at a point adjacent the end remote from the cam face 36. The bolt 38 is slidable within the slot 40 and prevents the withdrawal of the latch element 30 completely from the slideway 32.

A support element 42 extends over the other face of the block 26 and is fixedly attached thereto or formed integrally therewith. The support element 42 has a portion 44 projecting beyond each of the sides of the block 26 and another portion 46 projects beyond the end of the block 26 remote from the tongue 28.

An anchoring stick 48 is carried by the support element 42 on the side of the latter remote from the block 26. The anchoring stick 48 is detachably secured to the support element 42 by means of a plurality of bolts 50. The anchoring stick 48 tapers from its point of connection with the support element 42 to its free end and slopes forwardly of the blade 10 when the support element 42 and the block 26 are secured to the blade 10. The block 26 is insertable into the opening 16, so that the tongue 28 and the exterior end of the latch element 30 overlie one face of the blade and with the projecting portions 44 and 46 of the support element 42 overlying the other face of the blade.

The support element 42 has one end cut away adjacent the end wall 24 of the opening 16 when the block 26 is inserted therein, the cut away end 52 providing clearance for the insertion into and withdrawal from the block 26 into and out of the opening 16.

The latch element 30 is manually operable to the retracted position or may be automatically retracted by engagement of the cam face 36 with the adjacent wall 22 of the opening 16 upon the insertion of the block 26 in the opening 16. This allows the user of the saw 12 to attach the anchoring device of the present invention to the blade 10 and to detach the same therefrom with only one hand, when it is desired to use the anchoring stick 48 as a means for supporting against the traveling saw 14 a small branch or log, as shown in dotted lines in Figure 2 and designated by the reference numeral 54.

While only a preferred embodiment of the present invention has been shown and described, other embodiments are contemplated and numerous changes and modifications may be made therein without departing from the spirit of the invention as set forth in the appended claims.

What is claimed is:

1. In a portable power saw, the combination with an elongated blade, and a chain saw mounted for travel about the perimeter of said blade, said blade being provided with an opening extending therethrough and having a pair of side walls and an end wall extending between each of the adjacent ends of said side walls, of an anchoring device comprising a block conformably shaped to fit within said opening, a tongue projecting from one end of said block and extending from one face of said block to a point adjacent to and spaced from the other face of said block, a latch element having one end normally positioned exteriorly of the other end of said block and mounted in said block for movement to a position in which said one end is wholly within said block, a support element extending over the other face of said block and fixedly attached thereto, said element having a portion projecting beyond the sides and said other end of said block, said block being insertable into said opening so that the tongue and said one end of said latch element overlie one face of said blade with the projecting portions of said support element overlying the other face of said blade, and an anchoring stick carried by said support element.

2. In a portable power saw, the combination with an elongated blade, and a chain saw mounted for travel about the perimeter of said blade, said blade being provided with an opening extending therethrough and having a pair of side walls and an end wall extending between each of the adjacent ends of said side wall, of an anchoring device comprising a block conformably shaped to fit within said opening, a tongue projecting from one end of said block and extending from one face of said block to a point adjacent to and spaced from the other face of said block, a latch element having one end normally positioned exteriorly of the other end of said block and mounted in a slideway provided in said block for movement to a position in which said one end is wholly within said block, spring means positioned in said slideway and operatively connected to said latch element urging the latter to the exterior position, a support element extending over the other face of said block and fixedly attached thereto, said element having a portion projecting beyond the sides and said other end of said block, said block being insertable into said opening so that the tongue and said one end of said latch element overlie one face of said blade with the projecting portions of said support element overlying the other face of said blade, and an anchoring stick carried by said support element.

3. In a portable power saw, the combination with an elongated blade, and a chain saw mounted for travel about the perimeter of said blade, said blade being provided with an opening extending therethrough and having a pair of side walls and an end wall extending between each of the adjacent ends of said side walls, of an anchoring device comprising a block conformably shaped to fit within said opening, a tongue projecting from one end of said block and extending from one face of said block to a point adjacent to and spaced from the other face of said block, a latch element having one end normally positioned exteriorly of the other end of said block and mounted in said block for movement to a position in which said one end is fully within said block, a support element extending over the other face of said block and fixedly attached thereto, said element having a portion projecting beyond the sides and said other end of said block, said block being insertable into said opening so that the tongue and said one end of said latch element overlie one face of said blade with the projecting portions of said support element overlying the other face of said blade, there being a cam face on said one end of said latch element engageable with one of the end walls of said opening when said block is inserted into said opening to thereby effect the movement of said latch element to the position wholly within said block, and an anchoring stick carried by said support element.

4. The structure according to claim 2 wherein said spring means comprises a coil spring positioned within said slideway between the other end of said latch element and having one end bearing against the end of said slideway adjacent the other end of said latch element and having the other end bearing against the other end of said latch element.

References Cited in the file of this patent

UNITED STATES PATENTS

| | | |
|---|---|---|
| 253,047 | Hersey | Jan. 31, 1882 |
| 829,862 | Ely | Aug. 28, 1906 |
| 907,085 | McNutt | Dec. 15, 1908 |
| 1,319,712 | Kendon | Oct. 28, 1919 |
| 2,567,886 | Mall | Sept. 11, 1951 |
| 2,665,719 | Pennanen | Jan. 12, 1954 |